Sept. 13, 1949. J. W. SADLER 2,481,880
PROCESS FOR TREATING OXIDE PIGS
Filed April 11, 1947
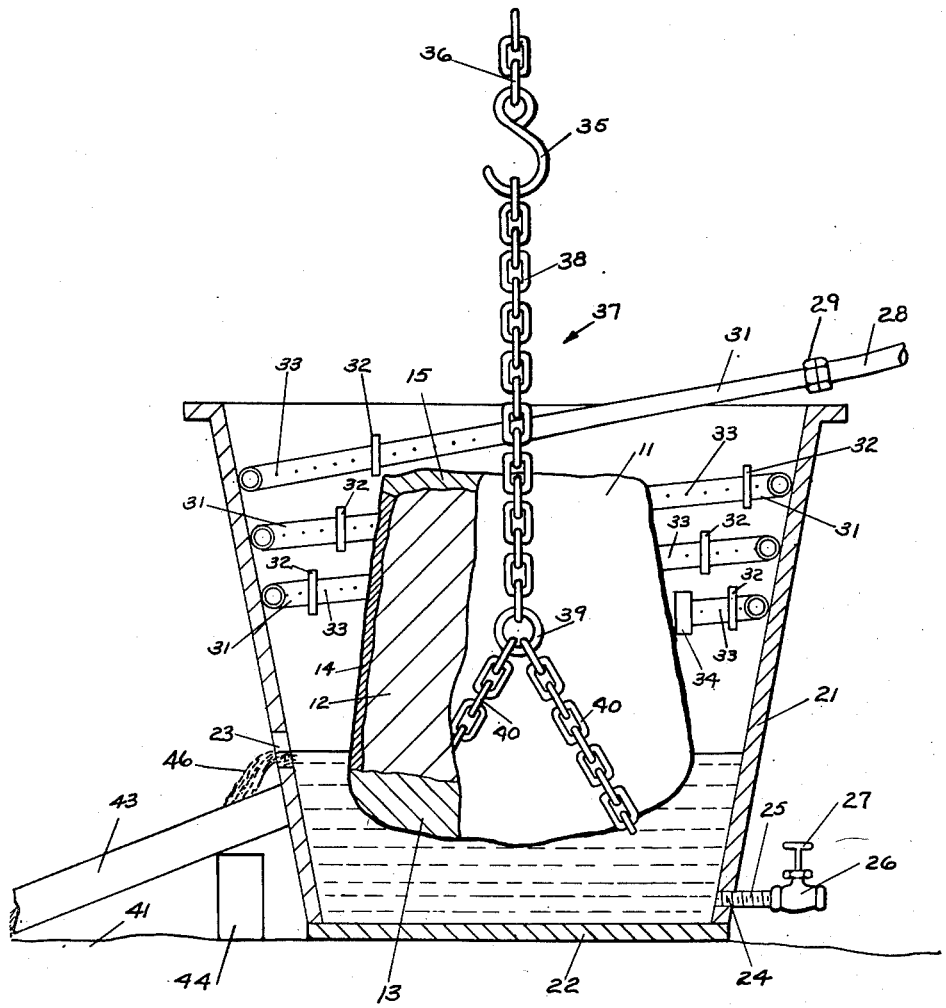
INVENTOR
JOHN W. SADLER
BY
*George Crumpton*
ATTORNEY Patented Sept. 13, 1949

UNITED STATES PATENT OFFICE 2,481,880

PROCESS FOR TREATING OXIDE PIGS

John W. Sadler, Niagara Falls, Ontario, Canada, assignor to Norton Company, Worcester, Mass., a corporation of Massachusetts Application April 11, 1947, Serial No. 740,838

6 Claims. (Cl. 134—6)

The invention relates to the manufacture of crystalline alumina in discrete crystals by the melting of ore in an electric furnace. The invention contemplates an improvement in the process described in U. S. Letters Patent No. 2,003,867 to Raymond R. Ridgway and the Reissue No. 20,547 of that patent.

One object of the invention is to save as much of the crystalline alumina as possible, yet to separate it from the partially converted material. Another object is to peel the shell of unconverted material from a pig of fused alumina in a simple yet thoroughly practical manner. Another object is to eliminate the job of first breaking up the pig with sledge hammers and then, from the fragments, removing the shell of unconverted material, which involves waste since it has been impossible to remove fragments of shell without removing also some of the good material. Another object is to lessen the labor and effort required to break up the pigs of crystalline alumina made according to the aforesaid Ridgway patent. Another object is to provide a facile and efficient process for removing a shell of partially reacted or unreacted material from a pig of refractory or abrasive material, such as a pig of oxide material.

Other objects will be in part obvious or in part pointed out hereinafter.

The invention accordingly consists in the several steps and relation and order of each of said steps to one or more of the others thereof, all as will be illustratively described herein, and the scope of the application of which will be indicated in the following claims.

In the accompanying drawing illustrating one of many possible embodiments of the mechanical features of this invention, the single figure is a cross sectional view of a tank for soaking a pig of alumina or the like, showing the pig partly in elevation and partly in section, and showing part of the hoisting apparatus.

An abrasive grade of aluminum oxide may be made by fusing bauxite in a Higgins furnace which is illustrated in U. S. patent to Aldus C. Higgins, No. 775,654, dated November 22, 1904. In such furnaces for many years bauxite and other alumina containing ores and also chemically precipitated alumina have been fused to produce various grades of abrasive aluminum oxide.

When the melt cools and solidifies, it is removed from the Higgins furnace, or more strictly and mechanically speaking the shell of the furnace is lifted exposing the solidified mass which is termed a pig.

The next step in the manufacture of abrasives was to break up the pig. For this purpose skull crackers were used but a large part of the job has been done by strong men with heavy sledges. Breaking up a pig of alumina solidified from a fusion is a laborious job.

The aforementioned patent to Ridgway No. 2,003,867 and its Reissue 20,547 discloses an advance in the art according to which sulphide material is added to the charge thus to produce sulphide in the melt and Ridgway succeeded in causing alumina to crystallize in a matrix of sulphide which could be hydrolyzed to release the individual crystals of alumina which were found to be purer than the alumina produced by fusing bauxite without the addition of a sulphide. For a full understanding of the Ridgway process reference should be made to the aforesaid patents.

However as a result of the Ridgway process as taught in these patents and as actually practised not all of the physical labor in breaking up a pig was eliminated. For an understanding of the problem involved it is necessary again to refer to the Higgins furnace. This furnace as actually shown in the patent and as for many years constructed consists of a hollow sheet steel frusto conical shell removable from a furnace bottom containing a lining of carbon. Molten alumina would certainly melt the frusto conical steel shell if it were not for one of the important features of the Higgins invention, namely a cascade of water continuously delivered at the outside top of the shell which takes away the heat so fast the shell cannot melt. As a result of trying to fuse bauxite in a steel shell which is continually being cooled there is formed a pool of molten alumina and, during the early stages of the fusion, oxides and in the case of the Ridgway patents also for example iron sulphide which pool gradually grows as the fusion proceeds but the material next to the shell never fuses.

Thus a pig of alumina has customarily had on the outside thereof a shell of unconverted material and such shells of unconverted material occur on pigs of alumina crystals in a sulphide matrix produced according to the Ridgway patents. Such shells of unconverted material are integral with the remainder of the pig.

In general pigs of aluminum oxide and this applies specifically to pigs made in accordance with the Ridgway patents (hereinafter Ridgway pigs) have also a top layer of unconverted material and a so-called button on the bottom which contains the reduction products such as ferrosilicon and metals. The expression "unconverted material" which is commonly used means that the material, though sintered and though much of its water has been driven off, is not an abrasive grade of fused alumina.

Referring now to the drawing there is shown a Ridgway pig 11 comprising a central mass 12 of crystals of alumina in a sulphide matrix, the central mass 12 being integrally formed with a button 13 on the bottom of the pig which button consists of reduction products including ferro-silicon and metals and impurities and the central mass 12 likewise being integral with a surrounding shell 14 of sintered unconverted material and a top layer 15 also of unconverted material.

In order to produce abrasive grains for the manufacture of grinding wheels the central mass 12 of a Ridgway pig is hydrolyzed while mechanically worked, which can be done by charging the central mass 12 in chunks into a large rotating drum partially filled with water; thereafter by a classification process the sulphide matrix material is removed from the crystals of alumina which are subsequently cleaned by washing and rewashing and acid treatment, and finally any ferrous material is removed by magnetic separators and the alumina grains are dried and then constitute abrasive material for the manufacture of grinding wheels needing only to be screened into different sizes and then made into grinding wheels by the addition of any desired bonding material, and subsequent molding, pressing, and vitrifying or baking as the case may be. In order to carry out this process of producing clean pure abrasive grains in discrete crystal particles both commercially and economically it is highly desirable and from the economical standpoint even necessary that the material charged into the first hydrolyzing process (illustratively the rotating drum partially filled with water) shall be only the central mass 12 of the alumina crystals in the matrix of sulphide. For the button 13 of ferro-silicon would not readily disintegrate in the rotating drum and neither would the shell 14 nor the top layer 15.

Since Ridgway pigs have been made and prior to my invention it has been the practice to break off the shell 14 and the top layer 15 and such portions of the button 13 as did not otherwise readily become detached, with sledge hammers, a laborious job only undertaken by large and strong men, but the button 13, the top layer 15 and especially the shell 14 would not, under sledge hammer blows, break clean from the central mass 12; instead large chunks of the central mass 12 were still attached to the portions 13 and 15 and especially the shell material 14 after breaking up the Ridgway pig. Further work was therefore done with sledge hammers to try to recover as much of the good central mass material 12 as possible from the bad material 13, 14 and 15 but there is an economic limit to such work and furthermore the material of the central mass 12 crumbles and is lost in the dirt of the pig room (which usually has a dirt floor) where the breaking operation is carried out. As the result of the use of the process of the present invention much good material which used to be lost is now saved. In fact the recovery of useful crystalline alumina per pig has been increased by about ten per cent by the invention.

Referring again to the drawing I provide a large steel frusto conical shell 21 which actually was the shell of a Higgins furnace of very large size. To the small end of this steel shell 21, I weld a steel plate 22. Thus there is formed a bucket which happens to be flaring, and this is convenient but the exact shape of the bucket is not a vital matter. I cut a generous hole 23 in the side of the shell 21 somewhat above the bottom plate 22 to provide an overflow orifice. Conveniently, I cut and thread a small hole 24 near the bottom of the shell 21 into which I screw a threaded pipe 25 connected to a valve 26 having a controlling hand wheel 27 for opening and closing the valve 26. The above simply constitutes a convenient device for discharging the liquid in the bucket whenever desired.

I provide a conduit 28 which may be a rubber hose, connected to a supply of water with a valve to turn the water off and on. This conduit 28 is connected as by means of a coupling 29 to a helical pipe 31 which extends into and around the inside of the shell 21 being fastened to the shell 21 in any convenient manner as by brackets 32 which may be pieces of strip iron welded to the shell 21. The pipe 31 has a great number of holes 33 all facing inwardly of the shell 21. The holes 33 are located at intervals continuously along the length of the pipe 31 starting somewhere at a point just after the pipe 31 has entered the shell 21, so as to leave no considerable length along the pipe 7. without holes 33. Exact spacing of the holes 33 however is unimportant. At the end of the pipe 31 is a cap 34 to make a dead end to the pipe. When water is turned on to flow through the conduit 27 it goes into the pipe 31 and exits from it only through the holes 33. There is thus produced a spray of water directed inwardly of the shell 21. Any means of producing such spray may be used and the number of turns of the pipe 31 or the evenness of its convolutions is unimportant provided a good spray of water is produced in the upper part of the shell 21.

It is customary in plants for the production of alumina pigs to have overhead hoists on travelling carriages for lifting and conveying pigs from the places where they are removed from the electric furnaces to the pig room all of which may be a continuous chamber with the pig room area remote from the area adjacent to the furnaces. In the drawings I show a steel hook 35 connected to an overhead chain 36 which extends downwardly from such a hoist on an overhead travelling carriage. In such plants there are chain slings 37 comprising a length of chain 38 connected to a pair of rings 39 (only one shown) which rings connect two lengths of chain 40 forming the bottom part of the sling. In the customary casting of aluminum oxide pigs and removal thereof to the pig room the contents of the furnace is first allowed to solidify enough on the outside for safe handling, then the shell of the Higgins furnace is hoisted from it leaving the red hot pig on a furnace bottom or hearth (see the Higgins patent) which in turn rests on a little railway car on tracks. This car is then run away from the place where the electrodes are located to a position in the chamber where it can be reached by the aforesaid hoist. After further cooling a sling 37 is placed on the pig which may now be transported to the pig room. In accordance with the process of the present invention a Ridgway pig 11 is suspended in a sling 37 and can be moved up and down and into any position in the pig room. The bucket comprising the shell 21 and the bottom 22 is located in any convenient place within reach of the hoist, for example it may be located on the dirt 41 which is the floor of the pig room. The Ridgway pig 11 is lowered into the shell 21 so that the top of the button 13 is just about on a level with the bottom of the hole 23. Then the water is turned on in the conduit 27 entering the pipe 21 and spraying the upper portion of the pig 11 as will be apparent from the drawing.

An important consideration is the temperature of the pig 11 when the water is turned on. If the temperature is above 100° centigrade the water will be turned into steam. I prefer that the shell 14 should be a little below 100° centigrade before the pig 11 is treated with water. I prefer that the outer portion of the central mass 12 should be at least slightly below 100° C. at the time. Nothing is gained by making steam, and in fact it may cause disintegration of the central mass 12. During the watering of the pig 11 it is held in the bucket comprising the shell 21 and bottom 22 by means of the sling 37 and the hoist which is thus tied up and therefore there is no point in placing the pig 11 within the shell 21 until it has sufficiently cooled. The pig 11 therefore will not usually be picked up by the hoist until the temperature of the pig is below 100° C. say 90° C. There is of course a temperature gradient in a cooling pig of alumina; it is hotter inside.

On the other hand the benefits of the process are not achieved to the fullest extent if the pig 11 is too cool. Heat produces a more rapid reaction and heat is desired. The pig 11 should not have cooled below 50° C. when it is sprayed with water and preferably not below 75° C. These temperatures refer to the outside of the pig, that is the temperature of the shell 14.

Thus in the practise of this invention I position the pig 11 as shown in the drawing when it is at a temperature within the above indicated range and then I spray it with water. The water does not necessarily cover the top layer 15, but it should reach the top of the shell 14. The flow of water should be considerable of the order of fifty gallons a minute. The water of course flows downward so all of the shell 14 is wet. The water furthermore collects in the bottom of shell 21 and fills it up to the hole 23 and therefrom overflows into a trough 43, supported by a block 44 whence it flows into a drain usually provided in pig rooms. It will be seen that the button 13 is below the water level.

After the pig 11 has been sprayed for a length of time which for a hot pig may be only about twenty minutes or for one somewhat cooler can be up to 45 minutes the pig 11 is simply removed from the shell 21 and then deposited in any available spot on the dirt floor 41 of the pig room. Here it is allowed to stand untouched usually overnight. Standing time should be usually no less than four hours, but preferably six to eight hours. Longer standing is not detrimental but usually it is desired for production reasons to get at the good material of the central mass 12 as soon as possible. A few light taps of the sledge (as distinguished from contiguous pounding for hours) will now remove the button 13 and the shell 14 practically peels off coming free from the central mass 12 without taking very much of the central mass 12 with it. The top layer 15 is readily removed. Hours of time are saved and furthermore much good material is saved. Once the central mass 12 is separated from the top layer 15, the button 13 and especially the shell 14, it is easily broken up with picks and the like and is then loaded into wheelbarrows or cars and sent to the hydrolyzing process.

The result of spraying the shell 14 with water is to make it peel readily from the central mass 12 without disintegrating the central mass 12. It is known that the central mass 12 is hydrolyzable. The surprising thing is that the pig can be treated with water without disintegrating a large part of the central mass 12. It is desirable not to disintegrate the central mass 12 before it is carried to the hydrolyzing room because the disintegrated mass cannot be easily handled and much would be lost in the dirt of the pig room. In fact if it were disintegrated before being hydrolyzed some of the central mass would be lost in the bucket comprising the shell 21 and the bottom plate 22 and would be contaminated with other materials. This would render the process practically useless. Why it is the water penetrates the shell 14 and then stops the reaction just when it touches the central mass is not clear especially since the hotter the material the better the reaction and the temperature of a pig increases inwardly. However the process is successful in actual practise and results in great savings as pointed out. The process not only loosens the shell 14 but also makes it a good deal easier to remove the button 13.

With regard to the length of time of spraying, this is partly a function of the amount of water delivered but in general will be between ten minutes and an hour if at least two convolutions of piping direct streams not over two inches apart upon the pig. However the bottom of the bucket should be filled with water up to the level of the hole 23 before discontinuing spraying and this can be a measure of the amount of spraying. But perhaps the best guide is the color of the effluent water 46, which at first is clear but gradually gets dark and later on becomes almost black. A good rule is to keep spraying about five minutes after the effluent water 46 has become quite black.

While the water can be left in the bucket for the next pig, it is better to exhaust it by means of the valve 26 in order to gain control by observing the color of the effluent water 46 as above described.

While many variations may be made in the process it is preferred to spray the upper part of the shell 14 with water but to immerse the lower part of the button 13 in water. The best results are achieved by providing the right quantity and concentration of water as indicated. However some good results can be achieved even if more or less water is used.

The button 13 will usually be put aside for sale as ferro-silicon or for other by-products. However the shell 14 and the layer 15 is unreacted or partially reacted material which can be charged into another furnace for the production of another pig. The process of the invention makes it easy to gather up the material of the shell 14 and the layer 15.

While the process has been described in connection with an alumina pig and specifically a Ridgway pig it may be applied to pigs of other oxides provided they have a central mass of oxide crystals embedded in a sulphide matrix.

It will thus be seen that there has been provided by this invention a process in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth is to be interpreted as illustrative and not in a limiting sense.

I claim:

1. Process for removing the shell of unconverted material on a pig of alumina crystals which are embedded in a matrix of sulphide and which pig comprises a core of converted material contained within a shell of unconverted material which comprises wetting said shell with water, allowing said pig to stand for a least two hours after it has been wet in order that the moisture in the shell derived from said water can penetrate said shell, and thereafter mechanically removing said shell leaving a large mass of said alumina crystals embedded in said matrix.

2. Process for removing the shell of unconverted material on a pig of alumina that includes some alumina crystals embedded in a matrix of sulphide and which pig comprises a core of converted material contained within a shell of unconverted material which comprises wetting the outside of the pig with water, then peeling off unconverted material from said pig.

3. Process for removing the shell of unconverted material on a pig of alumina crystals which are embedded in a matrix of sulphide and which pig comprises a core of converted material contained within a shell of unconverted material and said core having on the bottom a button of reduction products which comprises spraying the upper part of said shell with water and soaking the button of the pig in a pool of water, then discontinuing the spraying and soaking and after a time interval mechanically removing said shell.

4. Process for removing the shell of unconverted material on a pig of alumina crystals which are embedded in a matrix of sulphide and which pig comprises a core of converted material contained within a shell of unconverted material and which pig has just been formed in a furnace and which pig therefore initially is at a temperature well about 100° C. which comprises allowing said pig to cool to at least 100° C. on the outside and then, before it has cooled to 50° C. on the outside, wetting the shell of unconverted material with sufficient water to penetrate said shell.

5. Process for removing the shell of unconverted material on a pig of alumina crystals which are embedded in a matrix of sulphide and which pig comprises a core of converted material contained within a shell of unconverted material and said core having on the bottom a button of reduction products and which pig has just been formed in a furnace and which pig therefore initially is at a temperature well above 100° C. and for detaching the button of such pig which comprises allowing said pig to cool to at least 100° C. on the outside and then, before it has cooled to 50° C. on the outside, spraying the shell of unconverted material with water and immersing the button in water.

6. Process for removing the shell of unconverted material on a pig of alumina crystals which are embedded in a matrix of sulphide and which pig comprises a core of converted material contained within a shell of unconverted material and said core having on the bottom a button of reduction products and which pig has just been formed in a furnace and which pig therefore initially is at a temperature well above 100° C. and for detaching the button of such pig which comprises allowing said pig to cool to at least 100° C. on the outside and then, before it has cooled to 50° C. on the outside, spraying the shell of unconverted material with water and immersing the button in water, then removing the pig to take the button out of the water and discontinuing the spraying and, after at least two hours standing peeling off the shell and striking off the button.

JOHN W. SADLER.

REFERENCES CITED

The following references are of record in the file of this patent:

UNITED STATES PATENTS

| Number | Name | Date |
| --- | --- | --- |
| 775,654 | Higgins | Nov. 22, 1904 |
| Re. 17,001 | Haglund | June 19, 1928 |
| 2,003,867 | Ridgway | June 4, 1935 |
| Re. 20,547 | Ridgway | Nov. 2, 1937 |